United States Patent
Katouzian et al.

(10) Patent No.: US 11,315,242 B2
(45) Date of Patent: Apr. 26, 2022

(54) AUTOMATED FRACTURE DETECTION USING MACHINE LEARNING MODELS

(71) Applicant: International Business Machines Corporation, Armonk, NY (US)

(72) Inventors: Amin Katouzian, San Jose, CA (US); Benedikt Werner Graf, Charleston, MA (US); Ahmed El Harouni, San Jose, CA (US); Yiting Xie, Cambridge, MA (US); Arkadiusz Sitek, Ashland, MA (US); Vicky Guo, Woburn, MA (US); Arun Krishnan, Wodburn, MA (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 16/380,331

(22) Filed: Apr. 10, 2019

(65) Prior Publication Data

US 2020/0327660 A1  Oct. 15, 2020

(51) Int. Cl.
*G06T 7/00* (2017.01)
*G06T 3/40* (2006.01)
*G06N 20/20* (2019.01)

(52) U.S. Cl.
CPC .......... *G06T 7/0012* (2013.01); *G06N 20/20* (2019.01); *G06T 3/40* (2013.01); *G06T 7/97* (2017.01); *G06T 2207/20081* (2013.01); *G06T 2207/30008* (2013.01)

(58) Field of Classification Search
CPC .......... G06N 20/20; G06T 2207/20081; G06T 2207/30008; G06T 3/40; G06T 7/0012; G06T 7/97
See application file for complete search history.

(56) References Cited

U.S. PATENT DOCUMENTS

| | | | | |
|---|---|---|---|---|
| 9,480,439 | B2* | 11/2016 | Wu | G06V 10/752 |
| 2012/0143037 | A1 | 6/2012 | Najarian et al. | |
| 2014/0233820 | A1* | 8/2014 | Wu | A61B 6/505 |
| | | | | 382/131 |
| 2016/0364529 | A1* | 12/2016 | Li | G06K 9/6215 |
| 2019/0076101 | A1* | 3/2019 | Pan | A61B 6/4085 |
| 2019/0313963 | A1* | 10/2019 | Hillen | G06N 3/0454 |
| 2019/0318828 | A1* | 10/2019 | Li | G06N 20/00 |
| 2020/0085382 | A1* | 3/2020 | Taerum | G06K 9/6274 |

(Continued)

OTHER PUBLICATIONS

Ramandi, Hamed Lamei, Ryan T. Armstrong, and Peyman Mostaghimi. "Micro-CT image calibration to improve fracture aperture measurement." Case studies in nondestructive testing and evaluation 6 (2016): 4-13. (Year: 2016).*

(Continued)

*Primary Examiner* — Bobbak Safaipour
(74) *Attorney, Agent, or Firm* — Patterson + Sheridan, LLP (57) ABSTRACT

Techniques for fracture detection are provided. A first image is received to be processed to identify rib fractures. A first set of regions of interest (ROIs) is identified by processing the first image using a first machine learning model, where each ROI in the first set of ROIs corresponds to a first potential fracture. Further, a first ROI of the first set of ROIs is upsampled, and the system attempts to verify the first potential fracture in the first ROI by processing the upsampled first ROI using a second machine learning model.

20 Claims, 7 Drawing Sheets

(56) References Cited

U.S. PATENT DOCUMENTS

| | | | |
|---|---|---|---|
| 2020/0161005 A1* | 5/2020 | Lyman | G16H 15/00 |
| 2020/0250447 A1* | 8/2020 | Kaur | G06V 10/32 |
| 2020/0261231 A1* | 8/2020 | Chong | G06T 7/11 |
| 2020/0311926 A1* | 10/2020 | Tian | G01R 33/5602 |
| 2020/0357117 A1* | 11/2020 | Lyman | G06T 7/0012 |
| 2020/0364856 A1* | 11/2020 | Nicolaes | G06T 7/11 |
| 2021/0027460 A1* | 1/2021 | Beveridge | G06T 7/0012 |

OTHER PUBLICATIONS

Tan, Daniel Stanley, et al. "Depth Map Upsampling via Multi-Modal Generative Adversarial Network." Sensors 19.7 (2019): 1587. (Year: 2019).*

Marti, Marco Ros. "Deep Convolutional Neural Network for Effective Image Analysis: Design and Implementation of a Deep Pixel-Wise Segmentation Architecture." (2017). (Year: 2017).*

D. Kim and T. MacKinnon, "Artificial intelligence in fracture detection: transfer learning from deep convolutional neural networks," Clinical Radiology 73 (2018) 439e445.

R. Lindsey et al., "Deep neural network improves fracture detection by clinicians." Proceedings of the National Academy of Sciences Nov. 2018, 115 (45) 11591-11596.

I. Hmeidi et al., "Detecting Hand Bone Fractures in X-Ray Images." The International Conference on Signal Processing and Imaging Engineering (ICSPIE 2013), Tunisia, Oct. 2003. <https://www.researchgate.net/?publication/280037155>.

V. Lum et al., "Combining classifiers for bone fracture detection in X-ray images," IEEE International Conference on Image Processing 2005, Genova, 2005, pp. 1-1149.

R. Smith, "Segmentation and Fracture Detection in X-ray images for Traumatic Pelvic Injury," Ph. D. Dissertation, 2010, Virginia Commonwealth University.

Anonymous, "Method and System for Detecting Bone Fracture in X-ray images through Random Forest Fusion Technique." IP.com Disclosure No. IPCOM000241432D, Publication Date: Apr. 25, 2015.

Y. Cao et al. (IBM), "Fracture detection in x-ray images through stacked random forests feature fusion," 2015 IEEE 12th International Symposium on Biomedical Imaging (ISBI), New York, NY, 2015, pp. 801-805.

* cited by examiner

AUTOMATED FRACTURE DETECTION USING MACHINE LEARNING MODELS

BACKGROUND

The present disclosure relates to image processing, and more specifically, to use of machine learning to analyze images and identify fractures.

In order to identify bone fractures, medical professionals typically manually review images (e.g., X-ray images) to determine whether any fractures are present. This process is cumbersome and slow, as it requires intensive focus by the medical provider. Further, the process is inherently subjective and is prone to error, as professionals can easily fail to notice fractures (particularly small fractures). Further, attempts to develop improved techniques to identify fractures through partial or entire automation are computationally expensive, requiring significant compute resources and processor time to complete. As system performance (e.g., computational power or network connectivity) can differ significantly at different locations, existing methodologies are often unsuitable for ordinary use.

SUMMARY

According to one embodiment of the present disclosure, a method is provided. The method includes receiving a first image to be processed to identify rib fractures and identifying a first set of regions of interest (ROIs) by processing the first image using a first machine learning model, wherein each ROI in the first set of ROIs corresponds to a first potential fracture. The method further includes upsampling a first ROI of the first set of ROIs. Finally, the method includes attempting to verify the first potential fracture in the first ROI by processing the upsampled first ROI using a second machine learning model.

According to a second embodiment of the present disclosure, a computer-readable storage medium is provided. The computer-readable storage medium has computer-readable program code embodied therewith, the computer-readable program code executable by one or more computer processors to perform an operation. The operation includes receiving a first image to be processed to identify rib fractures and identifying a first set of regions of interest (ROIs) by processing the first image using a first machine learning model, wherein each ROI in the first set of ROIs corresponds to a first potential fracture. The operation further includes upsampling a first ROI of the first set of ROIs. Finally, the operation includes attempting to verify the first potential fracture in the first ROI by processing the upsampled first ROI using a second machine learning model.

According to a third embodiment of the present disclosure, a system is provided. The system includes one or more computer processors, and a memory containing a program which, when executed by the one or more computer processors, performs an operation. The operation includes receiving a first image to be processed to identify rib fractures and identifying a first set of regions of interest (ROIs) by processing the first image using a first machine learning model, wherein each ROI in the first set of ROIs corresponds to a first potential fracture. The operation further includes upsampling a first ROI of the first set of ROIs. Finally, the operation includes attempting to verify the first potential fracture in the first ROI by processing the upsampled first ROI using a second machine learning model.

DETAILED DESCRIPTION

Embodiments of the present disclosure present a hybrid solution for identifying bone fractures using image processing and machine learning (ML) techniques. In an embodiment, images are processed using a pipeline that consists of multiple smaller pipelines or sub-pipelines, which are arranged to improve the overall efficiency of the system. In one embodiment, the processing pipeline includes an overview pipeline, which first analyzes images at a high level to identify regions of interest (ROIs), and follows up with a more-intensive review of these identified regions. In another embodiment, the pipeline includes a focused pipeline that identifies each bone or bone segment, and closely reviews these identified areas, as discussed in more detail below.

In some embodiments, if fracture(s) are identified using the overview pipeline, the focused pipeline is not invoked. In this way, computational efficiency is improved. Further, in one embodiment, images are first analyzed at a low level of detail (e.g., by downsampling the image to a lower resolution), and the image is iteratively processed at higher resolutions until a fracture is verified. Using this iterative model, fractures can be identified with minimal resources. That is, because lower resolution images can be processed more rapidly and with fewer compute resources, embodiments of the present disclosure enable fractures to be identified quickly and with a minimum amount of computer resources.

In some embodiments, the overview pipeline and focused pipeline are executed sequentially, in order to minimize compute resources. In one embodiment, the pipelines are executed simultaneously (e.g., in parallel) in order to identify fractures as quickly as possible. In one such embodiment, when a fracture is identified, both pipelines are terminated to avoid resource waste. In some embodiments utilizing iteratively increased resolutions, a number of pipelines are instantiated in parallel to analyze each such resolution. For example, in one embodiment, a first pipeline configured to analyze images at a low resolution (e.g., 256 pixels by 256 pixels) may only work well with relatively large fractures, but may be able to complete the process much more rapidly than a second pipeline utilizing higher resolution (e.g., 1024×1024 pixels) that can identify smaller fractures.

In an embodiment, therefore, the pipeline may be initiated at both resolutions (or at many resolutions) simultaneously. In one embodiment, if any pipeline identifies a fracture, the remaining pipelines can be terminated, in order to minimize further use of computing resources. In one embodiment, a manager component collects data from each step of the pipeline(s) while images are being processed. At a termination point, the manager can then aggregate this data to determine an overall consensus for the pipelines (e.g., whether the bone is fractured, as well as where the fracture (s) are located). In this way, if various pipelines disagree with the result, the manager can nevertheless present a final conclusion, backed by an informed consensus.

Figure 1:
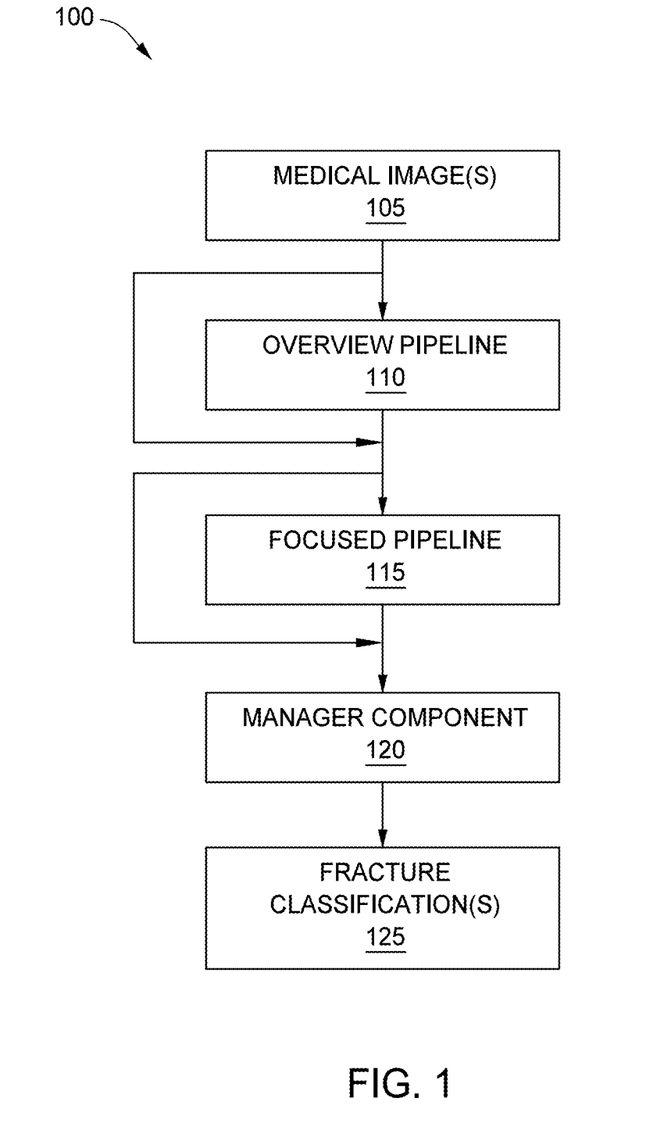
FIG. 1 illustrates a workflow for analyzing images using machine learning pipelines, according to one embodiment disclosed herein.

FIG. 1 illustrates a workflow 100 for analyzing images using machine learning pipelines, according to one embodiment disclosed herein. In the illustrated embodiment, Medical Image(s) 105 are provided to an Overview Pipeline 110 for processing. Additionally, as illustrated, in some embodiments, Medical Images 105 are also provided to the Focused Pipeline 115. In some embodiments, the Medical Images 105 are provided to both pipelines simultaneously. In one embodiment, the Focused Pipeline 115 is instantiated only when the Overview Pipeline 110 fails to identify any fractures in the received Medical Image(s) 105. Although not depicted in the illustrated workflow 100, in some embodiments, the Medical Image(s) 105 are first processed using one or more pre-processing techniques, such as to enhance the contrast, adjust the resolution, confirm the image is of sufficient quality, and the like.

In one embodiment, the Overview Pipeline 110 generally reviews the received Medical Image(s) 105 at a relatively low resolution, in order to identify ROIs where potential fractures may be located. In an embodiment, for each such ROI, the Overview Pipeline 110 then localizes its review by analyzing a higher-resolution area surrounding the region. For example, in one embodiment, received Medical Images 105 are downsampled to a relatively lower resolution (e.g., from 1024×1024 to 256×256), and these low resolution images are analyzed. In an embodiment, if one or more ROIs are identified, the Overview Pipeline 110 localizes these regions in higher resolution, and analyzes them. In one embodiment, this includes upsampling the reduced-resolution image, and selecting the identified ROI. In another embodiment, the Overview Pipeline 110 retrieves the original Medical Image 105 (e.g., the 1024×1024 image), and selects an area corresponding to the ROI (e.g., a 256×256 area surrounding the potential fracture). In this way, the Overview Pipeline 110 can identify bone fractures without actually processing the entire image at the larger resolution, which improves efficiency of the system.

That is, in an embodiment, the Overview Pipeline 110 uses models trained and configured to analyze input at a relatively low resolution (e.g., 256×256 pixels), which are significantly smaller, lighter, and faster than models trained for higher resolutions. In embodiments, this enables the Overview Pipeline 110 to analyze the entire Medical Image 105 (at a relatively low resolution), followed by analyzing potential fractures at a higher relative resolution to include better detail. Because only limited portions (e.g., ROIs) corresponding to potential fractures are analyzed at this increased resolution, the Overview Pipeline 110 avoids processing the entire image at the higher resolution, and thereby conserves resources and time.

In one embodiment, if the Overview Pipeline 110 fails to identify any fractures at this initial resolution, the image is upsampled to a relatively higher resolution (or the original image is downsampled to a lower resolution that is relatively higher than the first resolution), and the process is repeated. For example, the Overview Pipeline 110 may retrieve or generate a version of the input Medical Image 105 at 512×512 pixels, and analyze it to identify ROIs. If any are identified, the Overview Pipeline 110 can similarly analyze these regions at a higher localized resolution. In some embodiments, this iterative process repeats until the Overview Pipeline 110 identifies one or more fractures, or until the highest resolution available has been analyzed without identifying any fractures. Alternatively, in one embodiment, the Overview Pipeline 110 is instantiated at each resolution simultaneously, and all of these pipelines are terminated as soon as one identifies one or more fractures.

In some embodiments, the Focused Pipeline 115 can be executed after the Overview Pipeline 110. For example, in one embodiment, the Focused Pipeline 115 is invoked after the Overview Pipeline 110 completes, if no fractures have been found. For example, in an embodiment, the Overview Pipeline 110 can iteratively analyze progressively higher-resolution images, until either a fracture is detected or no higher resolution is available. In such an embodiment, if no higher resolution is available and no fracture has been identified, the Overview Pipeline 110 indicates that no fracture was found. In one embodiment, based on this indication, the Focused Pipeline 115 is instantiated to attempt to locate any fractures in the received Medical Image 105.

In some embodiments, the Focused Pipeline 115 is instead instantiated in parallel to the Overview Pipeline 110. Further, in some embodiments, the Focused Pipeline 115 may be executed first, with the Overview Pipeline 110 being instantiated only if the Focused Pipeline 115 fails to identify any fractures. In an embodiment, the Focused Pipeline 115 similarly receives the Medical Image 105 at a relatively reduced resolution, in order to reduce computational overhead and improve efficiencies. In one embodiment, the Focused Pipeline 115 first analyzes the image using one or more models trained to identify and label ribs (or other bones) in the image. In some embodiments, the Focused Pipeline 115 then generates patches using the low-resolution image. In an embodiment, each patch is a region of pixels (e.g., eight pixels squared) with a predefined size. In one embodiment, in order to generate patches, the Focused Pipeline 115 slides a window with the size of the desired patch over the image, generating a patch for each window position. In embodiments, the patches may overlap, or may be non-overlapping.

In some embodiments, the Focused Pipeline 115 generates a series of patches along each rib. That is, in such an embodiment, the Focused Pipeline 115 only utilizes patches that include at least a portion of at least one rib. In one embodiment, the Focused Pipeline 115 generates patches along the entire image, and discards patches that do not include at least some portion of one of the identified ribs. In another embodiment, the Focused Pipeline 115 specifically generates patches along each rib (e.g., following the outline of the rib, as identified using the machine learning model). In an embodiment, for each such patch, the Focused Pipeline 115 applies a patch-based classification ML model, to determine whether a fracture is present.

If so, the Focused Pipeline 115 localizes and upsamples the patch, and attempts to verify the fracture on the higher-resolution patch. If the fracture is verified, the Focused Pipeline 115 (or Manager Component 120) generates an indication of the fracture. In some embodiments, if the fracture is not verified (or if the patch-classifier does not identify any fractures), the Focused Pipeline 115 iteratively increases the resolution of the image, and generates patches anew. In this way, similarly to the Overview Pipeline 110, the Focused Pipeline 115 can iteratively analyze progressively higher-resolutions, in order to identify fractures with minimal computing resources. In one embodiment, if the highest resolution available has been processed, the Focused Pipeline 115 determines that no fractures are present.

In the illustrated embodiment, the results of the Overview Pipeline 110 and Focused Pipeline 115 are each provided to a Manager Component 120, which generates one or more Fracture Classifications 125 based on this data. In one embodiment, if either pipeline reports a fracture, the Manager Component 120 generates an indication of the identified fracture. In some embodiments, if neither pipelines identifies a fracture, the Manager Component 120 analyzes the available data (e.g., whether a fracture was suspected at each step of each pipeline, a confidence value at each step, and the like) in order to generate an overall consensus regarding any fractures. In one embodiment, the Manager Component 120 performs this aggregation regardless of the individual outcomes. For example, in one embodiment, even if one or both of the pipelines identify a fracture, the Manager Component 120 nevertheless aggregates and reviews the data to generate a final conclusion.

In embodiments, the Fracture Classifications 125 indicate whether any fractures were identified. In some embodiments, the Fracture Classifications 125 include one or more images (e.g., an area or region of the received Medical Image(s) 105), with highlights, heat maps, arrows and/or circles, or any suitable visualization to indicate the location (and, in some embodiments, orientation) of each identified fracture. In some embodiments, the Fracture Classifications 125 further indicate a confidence measure for the identifications. In one embodiment, the confidence measure indicates the likelihood of the patch or region being accurately classified as a fracture. In some embodiments, the average of the likelihoods is computed, and the likelihood value(s) associated with each patch and/or region can be represented and visualized as a heat map superimposed on the original image. In an embodiment, these Fracture Classifications 125 are provided to a healthcare provider, in order to facilitate treatment.

Figure 2:
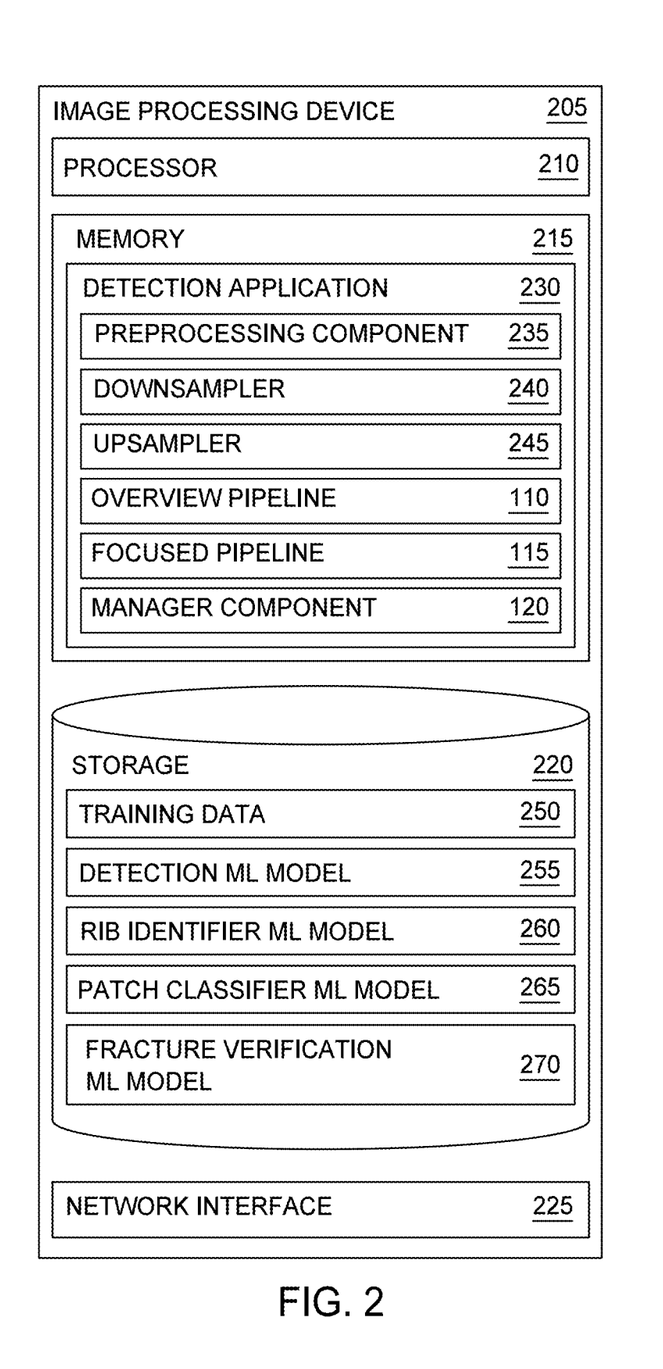
FIG. 2 is a block diagram illustrating an image processing device configured to analyze images to identify fractures, according to one embodiment disclosed herein.

FIG. 2 is a block diagram illustrating an Image Processing Device 205 configured to analyze images to identify fractures, according to one embodiment disclosed herein. In the illustrated embodiment, the Image Processing Device 205 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area network (SAN). Via the Network Interface 225, the Image Processing Device 205 can be communicatively coupled with one or more other devices including user devices, medical terminals, devices or services providing machine learning models or image analysis, databases storing labeled medical images, and the like.

In the illustrated embodiment, the Storage 220 includes a set of Training Data 250. The Storage 220 further includes a Detection ML Model 255, a Rib Identifier ML Model 260, a Patch Classifier ML Model 265, and a Fracture Verification ML Model 270. Although illustrated as residing in storage, each of these components may be located in any suitable location, including in Memory 215, or stored in one or more remote locations. In embodiments, the Training Data 250 includes labeled images used to train one or more ML models. For example, in some embodiments, if the Image Processing Device 205 is used to identify rib fractures, the Training Data 250 includes x-ray images of ribs and/or ribcages, with labels identifying each rib and/or each fracture. In one embodiment, the labels include bounding boxes showing the location of each fracture, as well as an indication as to the age of the fracture (e.g., acute, indeterminate, or old) and the type of the fracture (e.g., large, medium, or non-displaced). In some embodiments, the Training Data 250 is further labeled with relevant characteristics or descriptions, such as the angle of view of the image (e.g., front-on, side-view, and the like).

In an embodiment, the Detection ML Model 255 is used during the Overview Pipeline 110 to analyze an entire image (e.g., an x-ray of the entire ribcage of the patient) and identify potential fractures or ROIs. In embodiments, the Detection ML Model 255 may include, for example, a segmentation model such as U-Net, You Only Look Once (YOLO), random forest, and the like. In an embodiment, the Detection ML Model 255 is trained by using medical images as input, and providing the associated labels (e.g., indications of the fractures or ROIs, if any) as target output to the model. In this way, the Detection ML Model 255 is trained to receive x-ray images (e.g., of an index patient's ribcage) and return an indication as to any potential fractures or ROIs. In some embodiments, this includes identifying the coordinates of the ROI or potential fracture in the image. In one embodiment, the Detection ML Model 255 further provides an indication as to the bounding area (e.g., square, circle, polygon, and the like) that surrounds the potential fracture. In other embodiments, the system utilizes a predefined area around the center of the potential fracture as the ROI.

Although a single Detection ML Model 255 is illustrated, in embodiments, the Image Processing Device 205 may use any number of such models. In one embodiment, there is a distinct Detection ML Model 255 for each possible resolution. For example, in such an embodiment, a first Detection ML Model 255 can be trained to analyze low resolution images (e.g., 256×256), while a second Detection ML Model 255 is used for higher resolution (e.g., 512×512) and a third Detection ML Model 255 is used for the highest available resolution (e.g., 1024×1024). In an embodiment, the Overview Pipeline 110 selects the appropriate Detection ML Model 255 based on the resolution of the image that is currently being processed (e.g., the original image, or a downsampled version of the image).

In one embodiment, the Rib Identifier ML Model 260 is used during the Focused Pipeline 115 to analyze an entire image (e.g., an x-ray of the ribcage of a patient) to identify each rib in the image. In embodiments, the Rib Identifier ML Model 260 may include, for example, a segmentation model such as U-Net. In an embodiment, the Rib Identifier ML Model 260 is trained by using medical images as input, and providing the associated labels (e.g., indications of each rib in the image) as target output to the model. In this way, the Rib Identifier ML Model 260 is trained to receive x-ray images (e.g., of an index patient's ribcage) and return an indication as to each rib. In some embodiments, this includes identifying the coordinates of each rib (e.g., a central point and the outline of each rib). In one embodiment, the Rib Identifier ML Model 260 provides an indication as to the path or center of each rib.

In one embodiment, a single Rib Identifier ML Model 260 is used to segment the images of the patient based on the ribs. For example, in such an embodiment, the Rib Identifier ML Model 260 is trained to operate as the lowest resolution used by the system (or at the lowest resolution that allows for accurate rib detection). In such an embodiment, even if the Focused Pipeline 115 iteratively increases the resolution used, the system utilizes the same rib identifications provided initially by the Rib Identifier ML Model 260. In other embodiments, the Focused Pipeline 115 may use different Rib Identified ML Models 260 to repeatedly identify ribs at iteratively higher resolutions, prior to attempting to locate fractures.

In an embodiment, the Patch Classifier ML Model 265 is similarly used during the Focused Pipeline 115, and analyzes generated patches to classify them as potentially having a fracture, or lacking any fractures. In embodiments, the Patch Classifier ML Model 265 may include, for example, a binary classification model (or ensemble of classification models) such as a random forest, a support vector machine (SVM), a residual neural network (e.g., ResNet), a densely connected convolutional neural network (e.g., DenseNet), and the like. In embodiments, the Patch Classifier ML Model 265 classifies each patch as either a fracture patch or a non-fracture patch. In one embodiment, the Patch Classifier ML Model 265 is trained by providing sample patches as input, along with an indication as to the correct classification as target output.

Although a single Patch Classifier ML Model 265 is illustrated, in embodiments, the Image Processing Device 205 may use any number of such models. In one embodiment, there is a distinct Patch Classifier ML Model 265 for each possible resolution or patch size. For example, in such an embodiment, a first Patch Classifier ML Model 265 can be trained to analyze small patches (e.g., 8×8), while a second Patch Classifier ML Model 265 is used for higher patch sizes (e.g., 16×16) and a third Patch Classifier ML Model 265 is used for the largest available patch size (e.g., 32×32). In an embodiment, the Focused Pipeline 115 selects the appropriate Patch Classifier ML Model 265 based on the patch size that is currently being processed (e.g., as defined in a user configuration).

In one embodiment, the Fracture Verification ML Model 270 is used to analyze a portion of a larger image (e.g., an ROI or a patch) to attempt to verify any fractures in the region. In embodiments, the Fracture Verification ML Model 270 can be a classification model (or ensemble of classification models) such as a random forest, a support vector machine (SVM), a residual neural network (e.g., ResNet), a densely connected convolutional neural network (e.g., DenseNet), and the like. In an embodiment, the Fracture Verification ML Model 270 is trained using portions or regions of a larger image as input, and an indication as to whether any fracture(s) are present as target output. In one embodiment, the Overview Pipeline 110 and Focused Pipeline 115 both invoke the Fracture Verification ML Model 270 for each identified potential fracture. That is, in one embodiment, for each patch that the Patch Classifier ML Model 265 labels as a including a fracture, the Focused Pipeline 115 upsamples the patch and provides it to the Fracture Verification ML Model 270. Similarly, in an embodiment, for each ROI identified by the Detection ML Model 255, the Overview Pipeline 110 upsamples the region and provides it to the Fracture Verification ML Model 270.

Although a single Fracture Verification ML Model 270 is illustrated, in embodiments, the Image Processing Device 205 may use any number of such models. In one embodiment, there is a distinct Fracture Verification ML Model 270 for each possible patch or ROI size. For example, in such an embodiment, a first Fracture Verification ML Model 270 can be trained to analyze small patches or regions (e.g., 8×8), while a second Fracture Verification ML Model 270 is used for higher patch or region sizes (e.g., 16×16) and a third Fracture Verification ML Model 270 is used for the largest available patch or region size (e.g., 32×32). In an embodiment, the Overview Pipeline 110 and Focused Pipeline 115 select the appropriate Fracture Verification ML Model 270 based on the patch/ROI size that is currently being processed.

In the illustrated embodiment, the Memory 215 includes a Detection Application 230, which analyzes images and identifies bone (e.g., rib) fractures. Although illustrated as a software application residing in Memory 215, in embodiments, the operations and functionality of the Detection Application 230 can be implemented using hardware, software, or a combination of hardware and software. As illustrated, the Detection Application 230 includes a Preprocessing Component 235, a Downsampler 240, an Upsampler 245, an Overview Pipeline 110, a Focused Pipeline 115, and a Manager Component 120. Although depicted as discrete components for illustration, the operations and functionality of the Preprocessing Component 235, Downsampler 240, Upsampler 245, Overview Pipeline 110, Focused Pipeline 115, and Manager Component 120 may be combined or divided across any number of components and devices.

In an embodiment, the Preprocessing Component 235 receives images (either for training or for analyzing), and performs any required (or desired) preprocessing operations. For example, in one embodiment, the Preprocessing Component 235 applies one or more image enhancement techniques (e.g., reducing noise, sharpening, brightening, and the like). In some embodiments, the Preprocessing Component 235 performs quality control to ensure that the image is sufficiently high quality. For example, in such an embodiment, the Preprocessing Component 235 can confirm that the image has sufficiently high resolution (e.g., above a predefined threshold), includes the required subject matter (e.g., that it shows the entire ribcage), is not blurry, and the like.

In some embodiments, the Preprocessing Component 235 also determines the view provided by the image. This may include, for example, performing image analysis to recognize the view. In one embodiment, the image may have one or more tags or metadata describing the image (e.g., describing the angle of view provided, the content of the image, and the like), and the Preprocessing Component 235 reviews these tags in order to ensure the image is processed accurately (e.g., to select the correct set of ML models). For example, in some embodiments, the Preprocessing Component 235 selects a first model if the image is a front view of the ribcage, and a second model if it includes a side view of the ribcage. Further, in one embodiment, the Preprocessing Component 235 segments the image into parts (e.g., selecting the front ribcage as one portion, and the sides as a second portion). The Preprocessing Component 235 can then provide the regions corresponding to the edges of the ribcage to a model trained specifically for these oblique angles. In various embodiments, the Preprocessing Component 235 may similarly perform any other analysis or transformation to the image, such as cropping it, enlarging it or reducing its size, and the like.

In the illustrated embodiment, the Downsampler 240 receives prepared images from the Preprocessing Component 235, and down-samples them to lower resolution using one or more downsampling or downscaling algorithms or techniques. Once downsampled, the image can be provided to one or more processing pipelines to begin the substantive analysis. In an embodiment, the Upsampler 245 similarly receives images (or portions thereof) and upsamples (or upscales) them using one or more algorithms or techniques to increase their resolution. In one embodiment, the Upsampler 245 utilizes upsampling techniques to transform the smaller image (or portion) to a higher resolution version. In another embodiment, the Upsampler 245 retrieves all or a portion of the original image, and provides this as the upsampled image. In one embodiment, if an interim resolution is desired (e.g., less than the original size, but larger than the current size), the Upsampler 245 retrieves the original image, and the Downsampler 240 is used to reduce the resolution to the desired scale.

The Upsampler 245 is used at various points in the processing pipeline. For example, in one embodiment, if a patch or ROI is identified as potentially including a fracture, the Upsampler 245 is used to increase the resolution of this area for verification. Similarly, in one embodiment, if the verification fails (e.g., the system fails to identify or confirm the fracture at the higher resolution), the Upsampler 245 is used to upsample the entire image, in order to repeat the iterative process. Additionally, in an embodiment, if no fractures are identified during the initial review (e.g., by the Detection ML Model 255), the Upsampler 245 is used to generate a relatively higher resolution image to be analyzed anew.

In some embodiments, the Overview Pipeline 110 performs an initial analysis for received images. For example, as discussed above, the Overview Pipeline 110 can search the (low resolution) image for potential fractures (also referred to as ROIs). Each identified ROI is then localized and upsampled for verification in a relatively higher resolution. Additionally, in one embodiment, the Focused Pipeline 115 performs a thorough analysis of each rib, as discussed above. For example, in an embodiment, the Focused Pipeline 115 first identifies each rib, and then generates patches along each rib. The Focused Pipeline 115 can then review each patch to identify any fractures.

In the illustrated embodiment, the Manager Component 120 collects data at each step of the processing pipeline(s), and generates a final conclusion or result. For example, in one embodiment, the Manager Component 120 collects information about whether any fractures were identified (and if so, their locations) when the Detection ML Model 255 is used at each resolution. Similarly, the Manager Component 120 can collect information regarding whether each ROI was verified or not by the Fracture Verification ML Model 270, at each resolution. Additionally, in an embodiment, the Manager Component 120 collects data regarding the rib segmentation performed by the Rib Identifier ML Model 260 (such as how many ribs were identified), as well as from the Patch Classifier 265 at each resolution (e.g., whether each patch includes or does not include a fracture). Further, in an embodiment, the Manager Component 120 collects similar information about whether each patch with a potential fracture was verified or not.

In an embodiment, based on this data (collected at each stage and at each resolution), the Manager Component 120 generates a final conclusion. In one embodiment, the Manager Component 120 uses a voting system to determine a status for each potential fracture. For example, in such an embodiment, the Manager Component 120 can first identify all locations in the image where at least one stage of the system reported a fracture (or potential fracture). The Manager Component 120 can then aggregate, for each such location, the determinations made at each stage (and at each resolution). In an embodiment, the Manager Component 120 aggregates the indications using a voting system (e.g., as a "fracture" vote or a "non-fracture" vote). In one embodiment, the Manager Component 120 then concludes whether or not there is a fracture at the identified location based on this vote.

In some embodiments, rather than relying on such a voting system, the Manager Component 120 uses the conclusion of the Fracture Verification ML Model 270 as the final result. For example, in such an embodiment, if the Fracture Verification ML Model 270 fails to verify a potential fracture at the highest possible resolution, the Manager Component 120 can conclude that there is no fracture. However, if the Fracture Verification ML Model 270 confirms a fracture (at any resolution), in one embodiment, the Manager Component 120 immediately concludes that there is a fracture at the identified location, and ceases processing of that location. That is, in some embodiments, when a fracture is identified, the Manager Component 120 causes the ongoing processes to halt, with respect to that location. Thus, in such an embodiment, the location will not be analyzed at progressively higher resolutions. In an embodiment, however, other locations (e.g., locations with unconfirmed fractures or with no detected fractures) continue to be processed as normal (e.g., iteratively at progressively higher resolutions, until a fracture is verified or no higher resolution is available).

Figure 3:
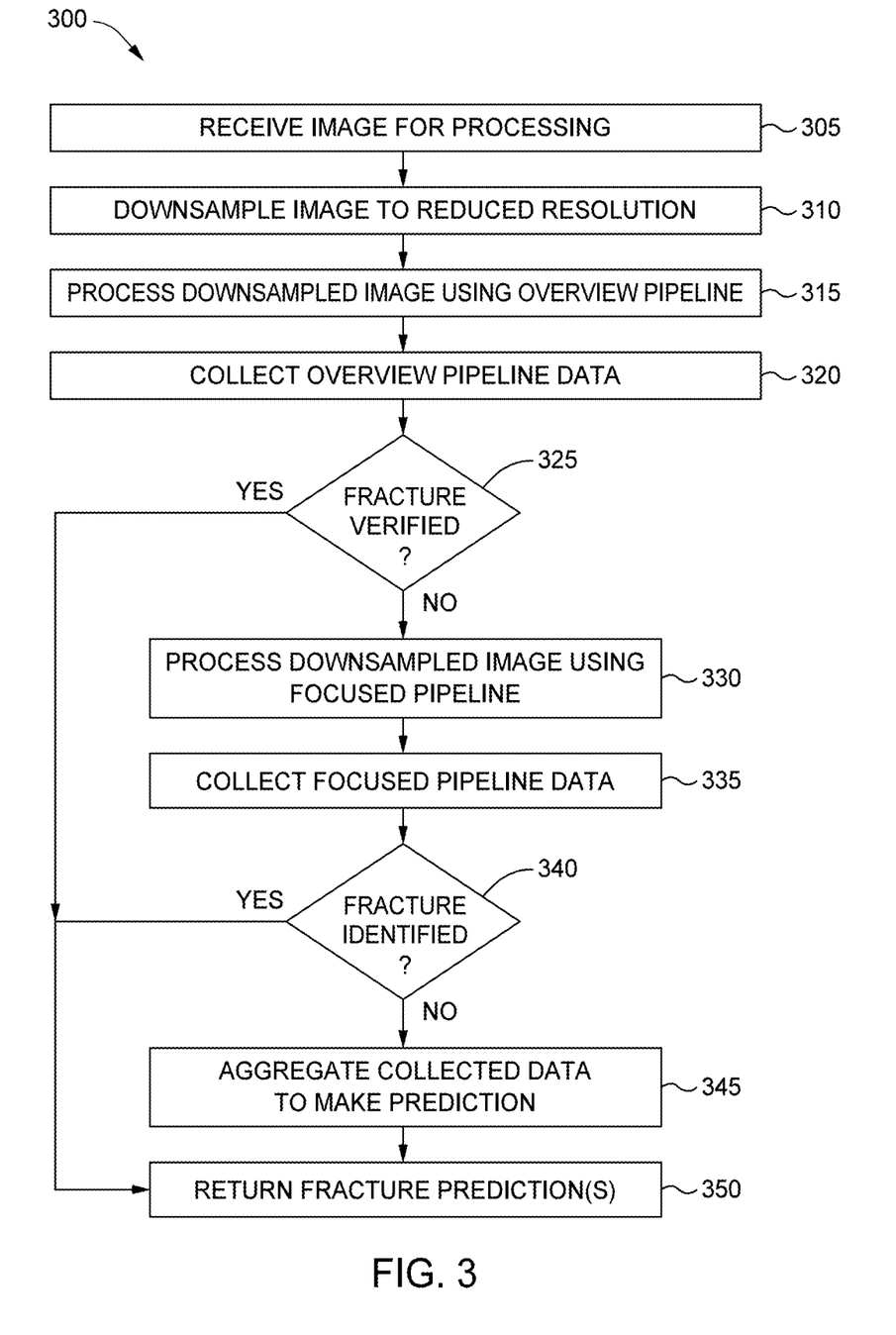
FIG. 3 is a flow diagram illustrating a method of analyzing images using a two-stage machine learning pipeline, according to one embodiment disclosed herein.

FIG. 3 is a flow diagram illustrating a method 300 of analyzing images using a two-stage machine learning pipeline, according to one embodiment disclosed herein. The method 300 begins at block 305, where the Detection Application 230 receives an image for processing. In one embodiment, the image is an x-ray image of a patient's ribcage. Of course, embodiments of the present disclosure can be utilized to identify fractures in any bones. For example, in one embodiment, the Detection Application 230 analyzes hand fractures using similar techniques. In such an embodiment, for example, the Detection Application 230 can use a ML model trained to identify and segment the bones of the hand rather than ribs. After receiving the image, the method 300 proceeds to block 310.

At block 310, the Detection Application 230 down-samples the received image to a reduced resolution, as discussed above. In embodiments, this enables the Detection Application 230 to reduce the computational requirements of processing the image, as well as increase the speed of the processing. At block 315, the Detection Application 230 processes the downsampled image using the Overview Pipeline 110. This processing is described in more detail below, with reference to FIG. 5. The method 300 then continues to block 320, where, during the operations of the overview pipeline, the Detection Application 230 collects data about the processing (e.g., whether a fracture has been identified or verified at each location, at each stage of processing, and at each resolution). The method 300 then proceeds to block 325.

At block 325, the Detection Application 230 determines whether a fracture has been verified for each a particular location. If so, the method 300 proceeds to block 350, where the Detection Application 230 returns an indication of the verified fracture. In one embodiment, the processing operations cease, with respect to the location of the verified fracture. In some embodiments, the overview pipeline processing continues for other unverified locations. Returning to block 325, if no fracture has been verified and the Overview Pipeline 110 has completed, the method 300 proceeds to block 330. At block 330, the Detection Application 230 instantiates a Focused Pipeline 115, and processes the downsampled image using the Focused Pipeline 115. Similarly, at block 335, the Detection Application 230 collects data about this processing, while the Focused Pipeline 115 is executing.

The method 300 then proceeds to block 340, where the Detection Application 230 determines, for each potential fracture location, whether a fracture has been verified. If so, the method 300 proceeds to block 350, as discussed above. If a fracture has not been verified for a particular location, the method 300 continues to block 345, where, after the Focused Pipeline 115 has concluded, the Detection Application 230 aggregates the collected data for the region, and makes a prediction. As discussed above, in one embodiment, this includes using a voting system to determine whether or not there is a fracture at the location. The method 300 then continues to block 350, where the Detection Application 230 returns this determination.

Figure 4A:
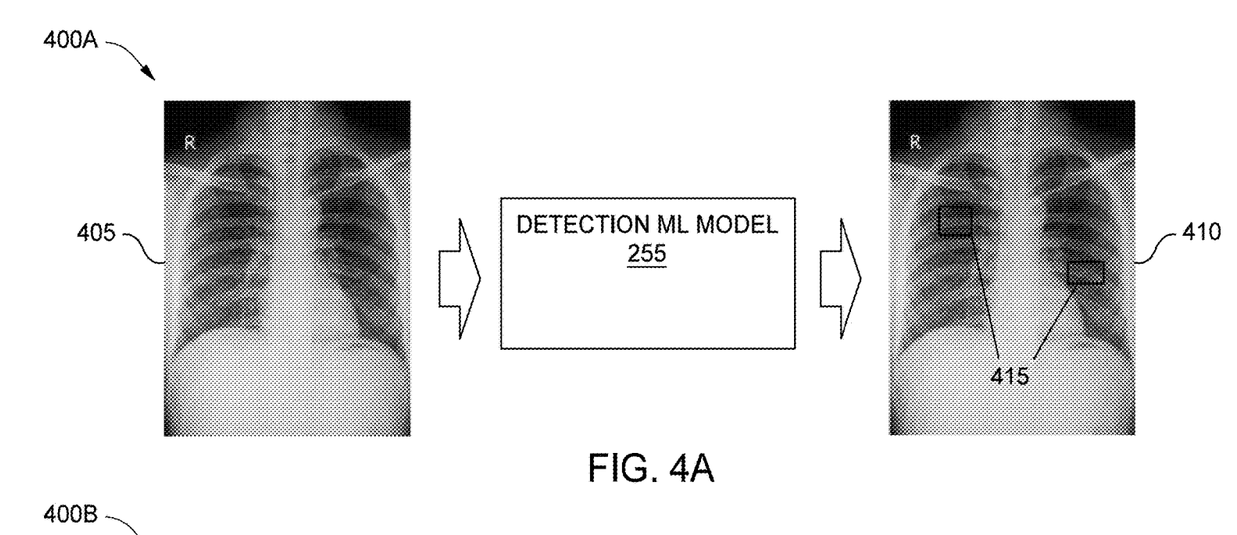
FIGS. 4A and 4B illustrate the use of machine learning models to perform initial image analysis, according to one embodiment disclosed herein.
Figure 4B:
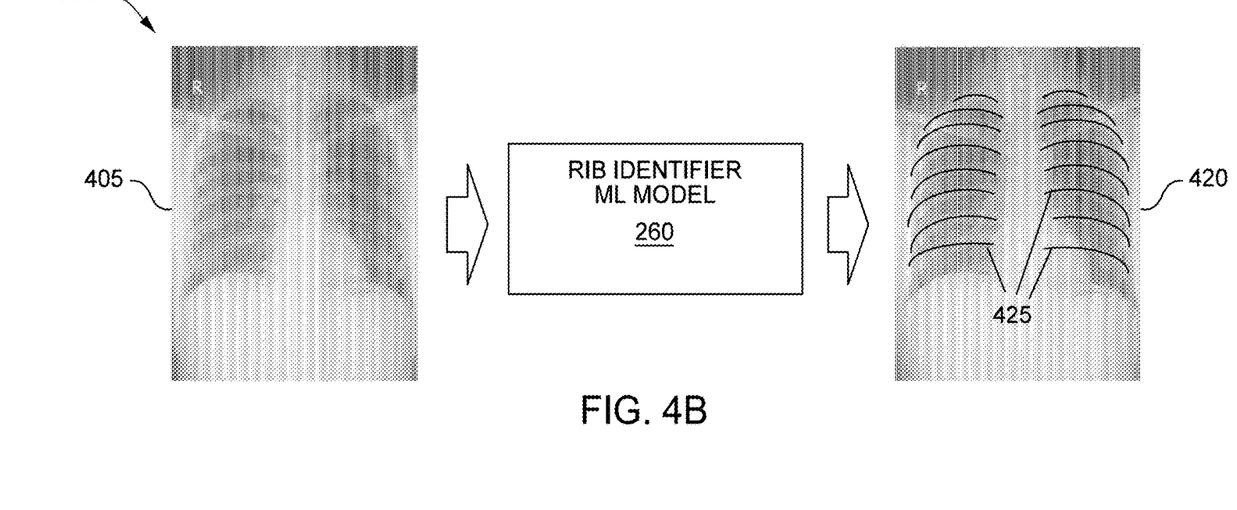

FIGS. 4A and 4B illustrate the use of machine learning models to perform initial image analysis, according to one embodiment disclosed herein. In the illustrated embodiments, the workflow 400A depicts application of the Detection ML Model 255, and workflow 400B depicts application of the Rib Identifier ML Model 260. As illustrated in the workflow 400A, an input Image 405 is received, where the Image 405 is an x-ray of a patient's ribcage, as viewed from the front. In one embodiment, the Image 405 is a downsampled version of the originally received image. As illustrated, the Detection ML Model 255 receives and processes this Image 405, and generates an Output 410 that identifies one or more ROIs 415. In one embodiment, the ROIs 415 are identified as a set of coordinates indicating the center of mass for each potential fracture. In embodiments, the boundaries of each ROI 415 may be a predefined dimension, or may be determined by the Detection ML Model 255, based on the potential fracture. In some embodiments, the Output 410 of the Detection ML Model 255 is used to generate a heat map or other visual indication of where potential fractures exist, on the Image 405.

As illustrated in the workflow 400B, the input Image 405 (or a downsampled version of the originally received image) is provided to the Rib Identifier ML Model 260, which processes this Image 405 and generates an Output 420 that identifies the location and/or orientation of each Rib 425. In one embodiment, each of the Ribs 425 is identified as a set of coordinates indicating the edges and/or center of the respective Rib 425. In some embodiments, the Rib Identifier ML Model 265 further identifies one or more portions of the Image 405 which should be processed with a different model. For example, in addition to labeling each Rib 425, the Rib Identifier ML Model 265 may identify the sides of the patient (e.g., the area where the identified Ribs 425 are only visible at a steep oblique angle), and indicate these portions to be processed using a different Patch Classifier ML Model 265.

Figure 5:
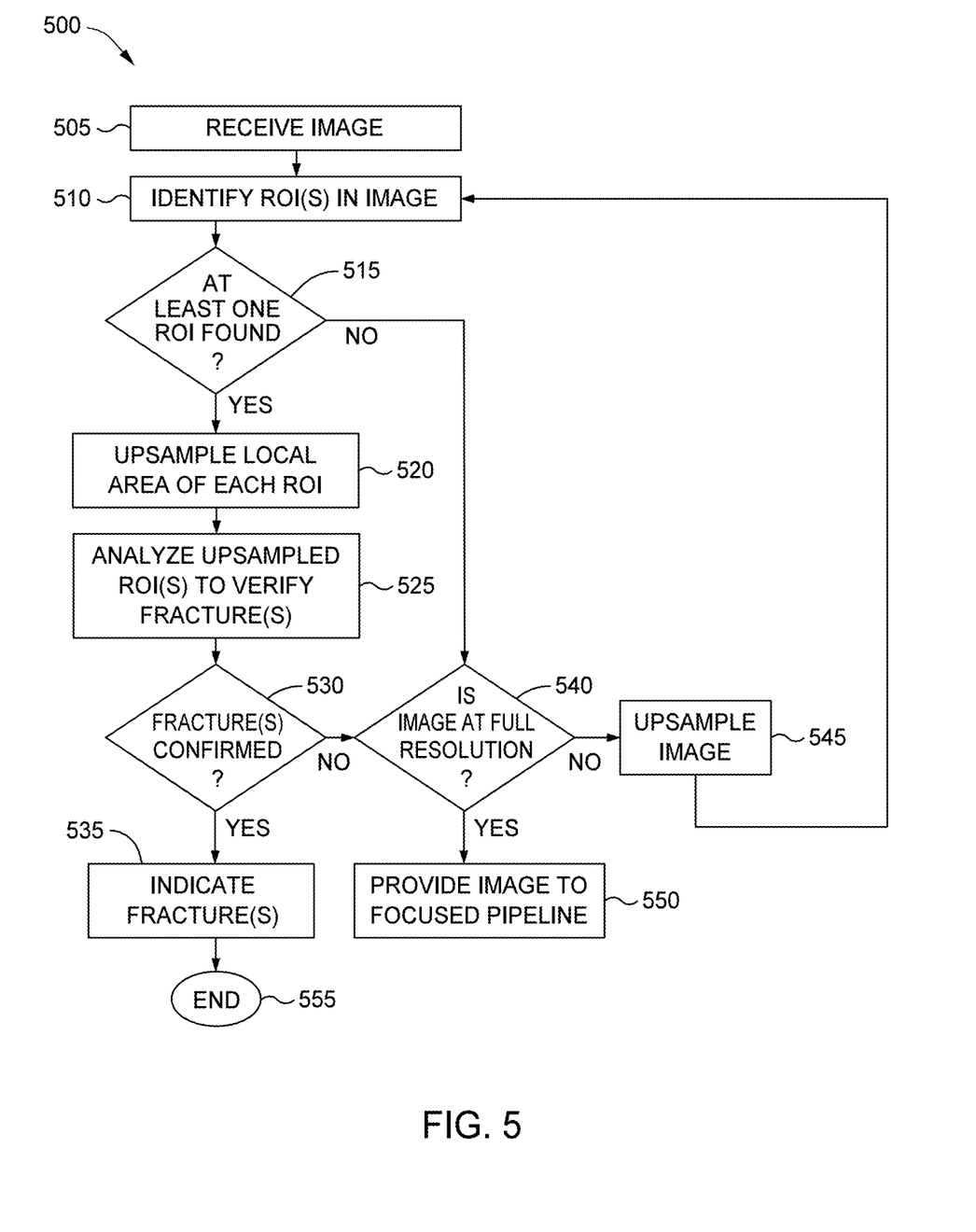
FIG. 5 is a flow diagram illustrating a method of processing images using an overview pipeline, according to one embodiment disclosed herein.

FIG. 5 is a flow diagram illustrating a method 500 of processing images using an Overview Pipeline 110, according to one embodiment disclosed herein. The method 500 begins at block 505, where the Overview Pipeline 110 receives an image to be processed. In an embodiment, this is a downsampled version of the original image. At block 510, the Overview Pipeline 110 uses a Detection ML Model 255 to identify any potential fractures in the image. Each such potential fracture is classified as a ROI. If, at block 515, no ROIs are identified, the method 500 proceeds to block 540, where the Overview Pipeline 110 determines whether the image that was analyzed is the highest resolution available. If not, the method 500 proceeds to block 545, where the Overview Pipeline 110 upsamples the image to a relatively higher resolution. The method 500 then returns to block 510, where the Overview Pipeline 110 again processes this higher resolution image using the Detection ML Model 255.

Returning to block 540, if the Overview Pipeline 110 determines that the image is at its highest resolution, the method 500 proceeds to block 550, where the Overview Pipeline 110 terminates, and the image is provided to the Focused Pipeline 115. Thus, in the illustrated embodiment, the Overview Pipeline 110 iteratively analyzes the image to identify potential fractures, upsamples the image if none are found, and repeats until either an ROI is found, or no additional upsampling can be performed. In some embodiments, even if an ROI is identified, blocks 510, 540, and 545 are repeated until the highest resolution is completed, to ensure that no potential fractures are missed. In such an embodiment, as soon as a potential fracture is identified, this region of the image is excluded from future iterations.

Returning to block 515, if at least one ROI was identified, the method 500 continues to block 520, where the Overview Pipeline 110 localizes its focus by upsampling the local area corresponding to each ROI. As discussed above, in embodiments, this may include extracting the area from the downsampled image and upsampling it. In some embodiments, upsampling the ROI includes determining the coordinates of the ROI in the analyzed image (e.g., the downsampled image), and converting these coordinates to the equivalent location on the original image. In such an embodiment, the Overview Pipeline 110 can then extract the ROI from the original image at its full resolution. The method 500 then continues to block 525.

At block 525, the Overview Pipeline 110 uses the Fracture Verification ML Model 270 to attempt to verify the presence (or absence) of a fracture in each of the upsampled ROIs. At block 530, the Overview Pipeline 110 determines, for each ROI, whether a fracture was confirmed or verified. If so, the method 500 proceeds to block 535, where the Overview Pipeline 110 indicates these fractures (e.g., by overlaying a visual emphasis of the fracture, over the original image). The method 500 then terminates at block 555. Returning to block 530, for each ROI where the Fracture Verification ML Model 270 failed to verify the fracture, the method 500 proceeds to block 540, discussed above.

In one embodiment, when a fracture is verified, the Overview Pipeline 110 ceases processing the entire image, and reports a fracture. In another embodiment, the Overview Pipeline 110 ceases processing all ROI(s) that correspond to verified fractures. In contrast, if a fracture is not verified, the corresponding ROI is iteratively processed at higher resolutions until a fracture is verified, or no higher resolution is available. In an alternative embodiment, the entire image is iteratively processed in this way until the Fracture Verification ML Model 270 concurs entirely with the Detection ML Mode 255. For example, in such an embodiment, the Overview Pipeline 110 iterates through progressively higher resolutions until every potential fracture identified by the Detection ML Model 255 is verified by the Fracture Verification ML Model 270 (and no fractures are identified by the Fracture Verification ML Model 270 unless they were also identified by the Detection ML Model 255), or until the image has reached its highest available resolution. If no concurrence is reached, in an embodiment, the Overview Pipeline 110 terminates without a conclusion. In such an embodiment, the Manager Component 120 may rely on the Focused Pipeline 115 to confirm fractures, and/or may aggregate the underlying data to make a final prediction.

Figure 6:
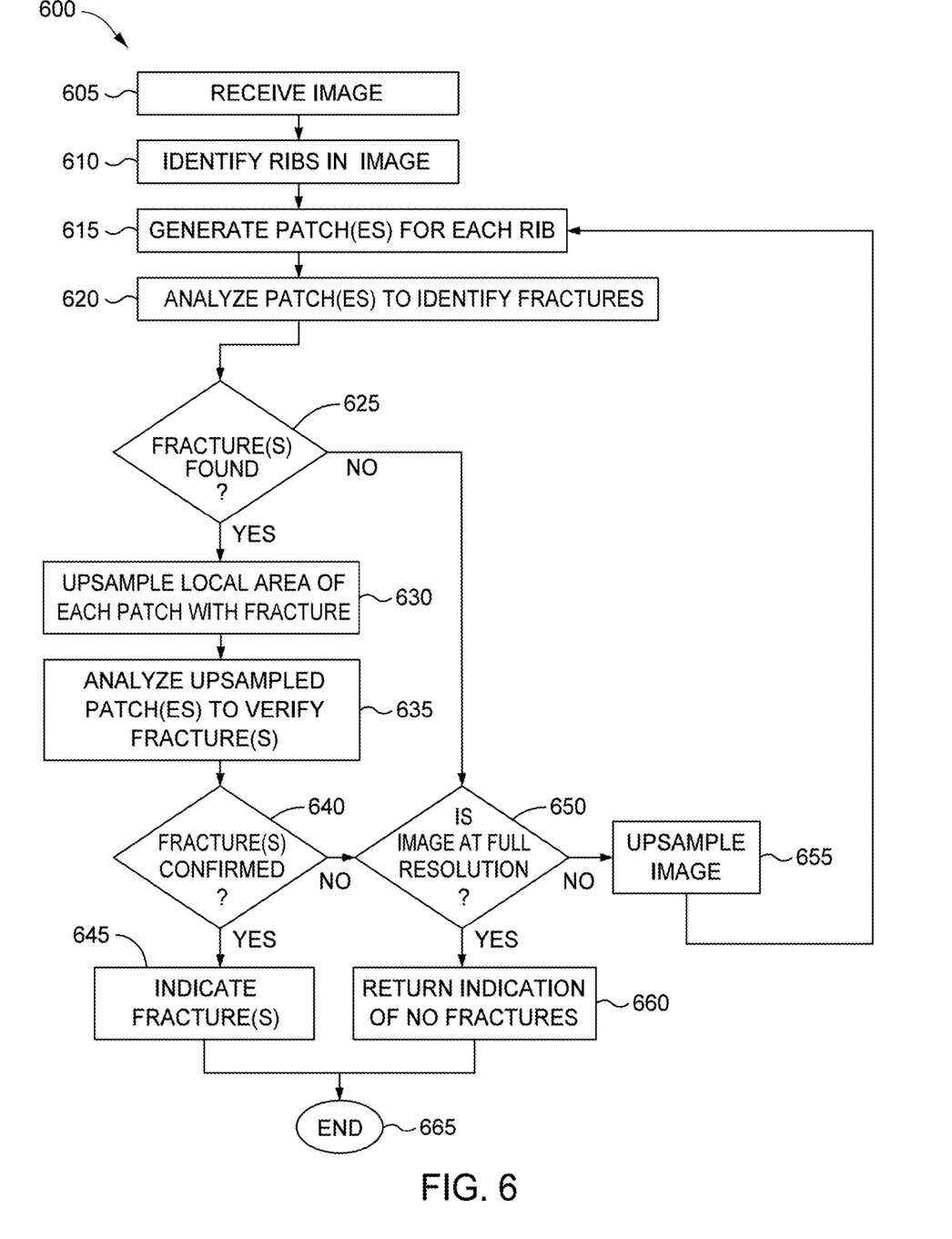
FIG. 6 is a flow diagram illustrating a method of processing images using a focused pipeline, according to one embodiment disclosed herein.

FIG. 6 is a flow diagram illustrating a method 600 of processing images using a focused pipeline, according to one embodiment disclosed herein. The method 600 begins at block 605, where the Focused Pipeline 115 receives an image for processing. In some embodiments, this is a downsampled version of the originally received image. At block 610, the Focused Pipeline 115 uses the Rib Identifier ML Model 260 to identify and label each rib in the image. The method 600 then proceeds to block 615, where the Focused Pipeline 115 generates one or more patches for each rib. As discussed above, in an embodiment, generating patches involves "sliding" a window across the image to generate a series of patches, each of which corresponds to a portion of the image. For example, in an embodiment, the Focused Pipeline 115 may extract an 8×8 square of pixels from the upper left corner of the image as a first patch, slide the window to the right by a predefined number of pixels, and extract that 8×8 square of pixels as a second patch.

In some embodiment, the Focused Pipeline 115 extracts such patches across the entire image. In such an embodiment, the Focused Pipeline 115 can then determine, for each patch, whether the patch includes at least a portion of one or more of the identified ribs. If so, the Focused Pipeline 115 can retain this patch for further processing. If a given patch does not include any rib, the Focused Pipeline 115 can discard the patch. In another embodiment, the Focused Pipeline 115 generates patches along each identified rib, rather than generating them across the entire image. For example, in one embodiment, the Focused Pipeline 115 uses the identified rib location and/or orientation to generate patches along the edges and/or center of each identified rib. The method 600 then proceeds to block 620.

At block 620, the Focused Pipeline 115 uses the Patch Classifier ML Model 265 to analyze each patch (or each patch that includes all or a portion of a rib), in order to classify the patches as either potentially including a fracture, or not including a fracture. In one embodiment, the patches are extracted from the downsampled image, and are thus relatively low resolution. In an embodiment, the Focused Pipeline 115 selects the appropriate Patch Classifier ML Model 265 based on the size and/or resolution of the patches currently being processed. If, at block 625, the Focused Pipeline 115 determines that none of the patches include a potential fracture, the method 600 proceeds to block 650, where the Focused Pipeline 115 determines whether the image being analyzed is at its highest available resolution. If not, the method 600 proceeds to block 655, where the Focused Pipeline 115 upsamples the image, as discussed above. The method 600 then returns to block 615, to generate new patches at this higher resolution.

Returning to block 650, if the Focused Pipeline 115 determines that the image is already at its highest resolution, the method 600 proceeds to block 660, where the Focused Pipeline 115 returns an indication that there are no fractures present in the image. The method 600 then terminates at block 665. Thus, in the illustrated embodiment, the process is iteratively repeated until either at least one potential fracture is identified, or no fractures are found, even at the highest resolution. Returning to block 625, if the Focused Pipeline 115 determines that at least one of the generated patches includes a potential fracture, the method 600 continues to block 630.

At block 630, the Focused Pipeline 115 localizes its focus by upsampling the local area corresponding to each patch that contains a potential fracture. As discussed above, in embodiments, this may include extracting the area from the downsampled image and upsampling it. In some embodiments, upsampling the patch includes determining the coordinates of the patch in the analyzed image (e.g., the downsampled image), and converting these coordinates to the equivalent location on the original image. In such an embodiment, the Focused Pipeline 115 can then extract the patch from the original image at its full resolution. The method 600 then continues to block 635.

At block 635, the Focused Pipeline 115 uses the Fracture Verification ML Model 270 to attempt to verify the presence (or absence) of a fracture in each of the upsampled patches. At block 640, the Focused Pipeline 115 determines, for each such patch, whether the fracture was confirmed or verified. If so, the method 600 proceeds to block 645, where the Focused Pipeline 115 indicates these fractures (e.g., by overlaying a visual emphasis of the fracture, over the original image). The method 600 then terminates at block 665. Returning to block 640, for each patch where the Fracture Verification ML Model 270 failed to verify the fracture, the method 600 proceeds to block 650, discussed above.

In one embodiment, when a fracture is verified, the Focused Pipeline 115 ceases processing the entire image, and reports a fracture. In another embodiment, the Focused Pipeline 115 ceases processing all patches that correspond to verified fractures. In contrast, if a fracture is not verified, the corresponding patches are iteratively processed at higher resolutions until a fracture is verified, or no higher resolution is available. In yet another embodiment, the Focused Pipeline 115 operates on a per-rib basis (e.g., ceasing analysis of a particular rib, once one or more fractures are identified and verified for the rib). In an alternative embodiment, the entire image is iteratively processed in this way until the Fracture Verification ML Model 270 concurs entirely with the Patch Classifier ML Model 265. For example, in such an embodiment, the Focused Pipeline 115 iterates through progressively higher resolutions until every potential fracture identified by the Patch Classifier ML Model 265 is verified by the Fracture Verification ML Model 270 (and no fractures are identified by the Fracture Verification ML Model 270 unless they were also identified by the Patch Classifier ML Model 265), or until the image has reached its highest available resolution. If no concurrence is reached, in an embodiment, the Focused Pipeline 115 terminates without a conclusion. In such an embodiment, the Manager Component 120 may rely on the Overview Pipeline 110 to confirm fractures, and/or may aggregate the underlying data to make a final prediction.

Figure 7:
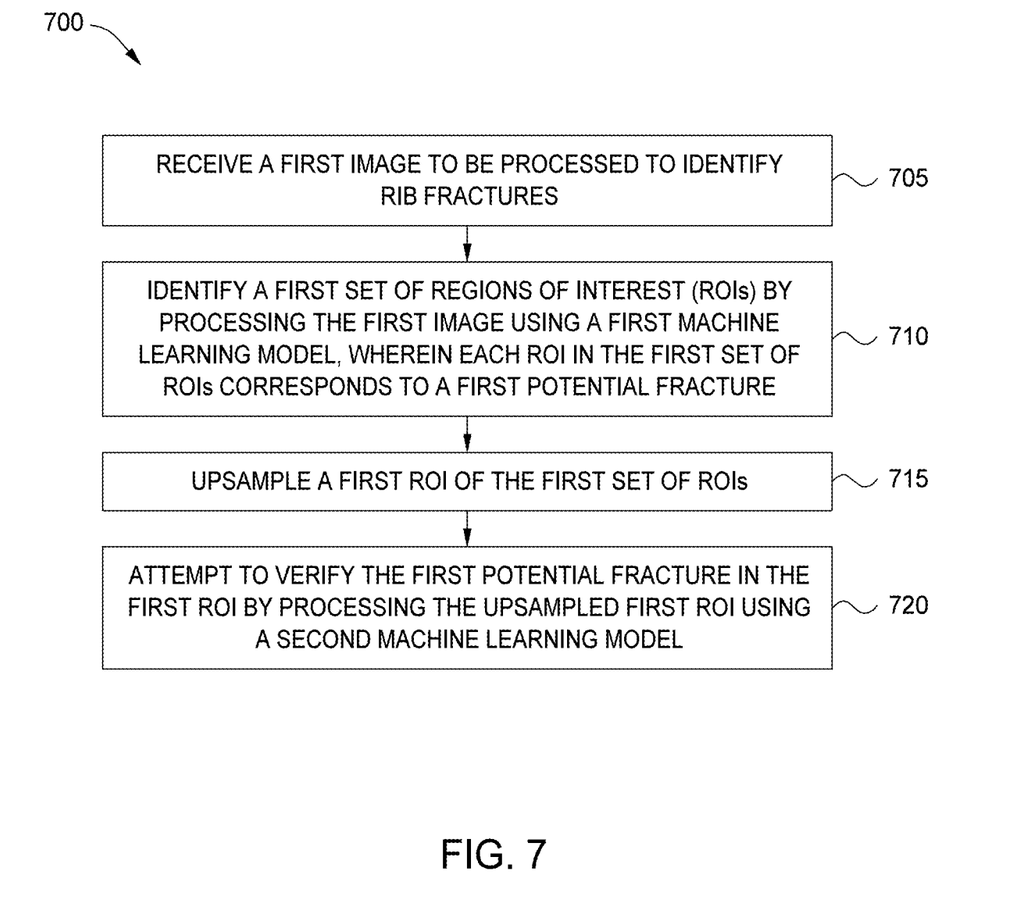
FIG. 7 is a flow diagram illustrating a method of processing images to identify fractures, according to one embodiment disclosed herein.

FIG. 7 is a flow diagram illustrating a method 700 of processing images to identify fractures, according to one embodiment disclosed herein. The method 700 begins at block 705, where a Detection Application 230 receives a first image to be processed to identify rib fractures. At block 710, the Detection Application 230 identifies a first set of regions of interest (ROIs) by processing the first image using a first machine learning model, wherein each ROI in the first set of ROIs corresponds to a first potential fracture. The method 700 then continues to block 715, where the Detection Application 230 upsamples a first ROI of the first set of ROIs. Finally, at block 720, the Detection Application 230 attempts to verify the first potential fracture in the first ROI by processing the upsampled first ROI using a second machine learning model.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a Detection Application 230) or related data available in the cloud. For example, the Detection Application 230 could execute on a computing system in the cloud and receive and analyze images to identify fractures. In such a case, the Detection Application 230 could use multiple machine learning pipelines to identify fractures, and store fracture results and the machine learning models at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving a first image to be processed to identify rib fractures;
   identifying a first set of regions of interest (ROIs), each corresponding to a respective potential fracture, by processing the first image using a first machine learning model trained to identify fractures, wherein at least one portion of the first image is not included in the set of ROIs; and
   in response to identifying a first ROI, of the first set of ROIs, corresponding to a first potential fracture:
      upsampling the first ROI to yield an upsampled first ROI that is higher resolution than the first ROI; and
      attempting to verify the first potential fracture in the first ROI by processing the upsampled first ROI using a second machine learning model.

2. The method of claim 1, the method further comprising, upon failing to verify the first potential fracture in the first ROI:
   upsampling the first image; and
   identifying a second set of ROIs by processing the upsampled first image using the first machine learning model.

3. The method of claim 1, the method further comprising, upon verifying the first potential fracture in the first ROI:
   providing an indication of the first potential fracture; and
   terminating a processing pipeline being used to process the first image to identify rib fractures.

4. The method of claim 1, the method further comprising:
   receiving a second image to be processed to identify rib fractures;
   determining that there are no ROIs in the second image, by processing the second image using the first machine learning model; and
   upon determining that there are no ROIs in the second image:
      upsampling the second image; and
      processing the upsampled second image using the first machine learning model.

5. The method of claim 1, the method further comprising:
   identifying one or more ribs in the first image using a third machine learning model;
   generating a first set of patches along a first rib of the one or more identified ribs;
   identifying a second potential fracture in a first patch of the first set of patches, by processing the first patch using a fourth machine learning model;
   upsampling the first patch; and
   attempting to verify the second potential fracture in the first patch by processing the upsampled first patch using the second machine learning model.

6. The method of claim 5, the method further comprising, upon failing to verify the second potential fracture in the first patch:
   upsampling the first image; and
   generating a second set of patches along the first rib of the one or more identified ribs.

7. The method of claim 5, the method further comprising:
generating a second set of patches along a second rib of the one or more identified ribs;
upon failing to identify any potential fractures in a second patch of the second set of patches:
upsampling the first image;
generating a third set of patches along the second rib in the upsampled first image; and
processing a third patch of the third set of patches using the fourth machine learning model.

8. The method of claim 7, the method further comprising:
determining, using the fourth machine learning model, that none of the third set of patches include a potential fracture;
providing an indication that a patient associated with the first image does not have a rib fracture; and
terminating a processing pipeline being used to process the first image to identify rib fractures.

9. The method of claim 1, wherein the first image is received in a first resolution, the method further comprising:
prior to identifying the first set of ROIs, downsampling the first image to a second resolution that is relatively lower than the first resolution.

10. A computer-readable storage medium having computer-readable program code embodied therewith, the computer-readable program code executable by one or more computer processors to perform an operation comprising:
receiving a first image to be processed to identify rib fractures;
identifying a first set of regions of interest (ROIs), each corresponding to a respective potential fracture, by processing the first image using a first machine learning model trained to identify fractures, wherein at least one portion of the first image is not included in the set of ROIs; and
in response to identifying a first ROI, of the first set of ROIs, corresponding to a first potential fracture:
upsampling the first ROI to yield an upsampled first ROI that is higher resolution than the first ROI; and
attempting to verify the first potential fracture in the first ROI by processing the upsampled first ROI using a second machine learning model.

11. The computer-readable storage medium of claim 10, the operation further comprising, upon failing to verify the first potential fracture in the first ROI:
upsampling the first image; and
identifying a second set of ROIs by processing the upsampled first image using the first machine learning model.

12. The computer-readable storage medium of claim 10, the operation further comprising:
receiving a second image to be processed to identify rib fractures;
determining that there are no ROIs in the second image, by processing the second image using the first machine learning model; and
upon determining that there are no ROIs in the second image:
upsampling the second image; and
processing the upsampled second image using the first machine learning model.

13. The computer-readable storage medium of claim 10, the operation further comprising:
identifying one or more ribs in the first image using a third machine learning model;
generating a first set of patches along a first rib of the one or more identified ribs;
identifying a second potential fracture in a first patch of the first set of patches, by processing the first patch using a fourth machine learning model;
upsampling the first patch; and
attempting to verify the second potential fracture in the first patch by processing the upsampled first patch using the second machine learning model.

14. The computer-readable storage medium of claim 13, the operation further comprising:
generating a second set of patches along a second rib of the one or more identified ribs;
upon failing to identify any potential fractures in a second patch of the second set of patches:
upsampling the first image;
generating a third set of patches along the second rib in the upsampled first image; and
processing a third patch of the third set of patches using the fourth machine learning model.

15. The computer-readable storage medium of claim 14, the operation further comprising:
determining, using the fourth machine learning model, that none of the third set of patches include a potential fracture;
providing an indication that a patient associated with the first image does not have a rib fracture; and
terminating a processing pipeline being used to process the first image to identify rib fractures.

16. A system comprising:
one or more computer processors; and
a memory containing a program which when executed by the one or more computer processors performs an operation, the operation comprising:
receiving a first image to be processed to identify rib fractures;
identifying a first set of regions of interest (ROIs), each corresponding to a respective potential fracture, by processing the first image using a first machine learning model trained to identify fractures, wherein at least one portion of the first image is not included in the set of ROIs; and
in response to identifying a first ROI, of the first set of ROIs, corresponding to a first potential fracture:
upsampling the first ROI to yield an upsampled first ROI that is higher resolution than the first ROI; and
attempting to verify the first potential fracture in the first ROI by processing the upsampled first ROI using a second machine learning model.

17. The system of claim 16, the operation further comprising, upon failing to verify the first potential fracture in the first ROI:
upsampling the first image; and
identifying a second set of ROIs by processing the upsampled first image using the first machine learning model.

18. The system of claim 16, the operation further comprising:
receiving a second image to be processed to identify rib fractures;
determining that there are no ROIs in the second image, by processing the second image using the first machine learning model; and
upon determining that there are no ROIs in the second image:
upsampling the second image; and
processing the upsampled second image using the first machine learning model.

19. The system of claim 16, the operation further comprising:
- identifying one or more ribs in the first image using a third machine learning model;
- generating a first set of patches along a first rib of the one or more identified ribs;
- identifying a second potential fracture in a first patch of the first set of patches, by processing the first patch using a fourth machine learning model;
- upsampling the first patch; and
- attempting to verify the second potential fracture in the first patch by processing the upsampled first patch using the second machine learning model.

20. The system of claim 19, the operation further comprising:
- generating a second set of patches along a second rib of the one or more identified ribs;
- upon failing to identify any potential fractures in a second patch of the second set of patches:
  - upsampling the first image;
  - generating a third set of patches along the second rib in the upsampled first image; and
  - processing a third patch of the third set of patches using the fourth machine learning model.

* * * * *